United States Patent
Rekaya et al.

(10) Patent No.: US 12,418,331 B2
(45) Date of Patent: Sep. 16, 2025

(54) DEVICES AND METHODS FOR RECURSIVE BLOCK PRECODING

(71) Applicant: INSTITUT MINES TELECOM, Palaiseau (FR)

(72) Inventors: Ghaya Rekaya, Antony (FR); Aymen Askri, Palaiseau (FR)

(73) Assignee: INSTITUT MINES TELECOM, Palaiseau (FR)

(*) Notice: Subject to any disclaimer, the term of this patent is extended or adjusted under 35 U.S.C. 154(b) by 313 days.

(21) Appl. No.: 18/026,561

(22) PCT Filed: Sep. 24, 2021

(86) PCT No.: PCT/EP2021/076298
§ 371 (c)(1),
(2) Date: Mar. 15, 2023

(87) PCT Pub. No.: WO2022/069353
PCT Pub. Date: Apr. 7, 2022

(65) Prior Publication Data
US 2024/0030969 A1    Jan. 25, 2024

(30) Foreign Application Priority Data
Sep. 29, 2020   (EP) .................................... 20306114

(51) Int. Cl.
*H04B 7/0456* (2017.01)
*H04B 7/0452* (2017.01)

(52) U.S. Cl.
CPC ......... *H04B 7/0456* (2013.01); *H04B 7/0452* (2013.01)

(58) Field of Classification Search
CPC .. H04B 7/0456; H04B 7/0452; H04B 7/0465; H04B 7/063
See application file for complete search history.

(56) References Cited

U.S. PATENT DOCUMENTS

2013/0094604 A1*  4/2013  Mondal ................ H04B 7/0469
                                                           375/295
2013/0142277 A1*  6/2013  Yeon .................... H04B 7/0617
                                                           375/295
(Continued)

FOREIGN PATENT DOCUMENTS

EP          2 725 731 A1     4/2014

OTHER PUBLICATIONS

Overview of Precoding Techniques for Massive MIMO (year: 2021).*
(Continued)

Primary Examiner — Nizar N Sivji
(74) Attorney, Agent, or Firm — BakerHostetler (57) ABSTRACT

A precoder for precoding a vector of information symbols to be sent to a plurality of users, the precoder includes a user ordering and grouping unit configured to group the plurality of users depending on one or more quality of service indicators and on modulation and coding parameters associated with the plurality of users, the user ordering and grouping unit being configured to divide a predefined upper triangular precoding matrix into a plurality of sub-matrices and to divide the vector of information symbols into a plurality of sub-vectors, each sub-vector comprising information symbols to be sent to a group of users, the sub-vectors being arranged according to an arbitrary order of the one or more quality of service indicators; a precoding unit configured to determine a perturbation vector according to the minimization of a transmit power metric, the perturbation vector comprising a plurality of perturbation sub-vectors, each perturbation sub-vector corresponding to a sub-vector of information symbols, the precoding unit being configured to determine an estimate of each perturbation sub-vector by applying a recursive search algorithm.

9 Claims, 3 Drawing Sheets

(56) References Cited

U.S. PATENT DOCUMENTS

| | | | |
|---|---|---|---|
| 2014/0362784 A1* | 12/2014 | Yue | H04B 7/0486 370/329 |
| 2015/0295671 A1* | 10/2015 | Na | H04B 7/0634 370/329 |
| 2015/0349932 A1* | 12/2015 | Onodera | H04L 1/1812 370/329 |
| 2021/0367645 A1* | 11/2021 | Delfeld | H04L 5/0048 |
| 2022/0321180 A1* | 10/2022 | Huang | H04L 25/03343 |

OTHER PUBLICATIONS

A New Dedicates Pilot Allocation Scheme in Multiuser MIMO OFDM With Vector Perturbation (Year: 2011).*
A Tutorial on Interference Exploitation via Symbol-Level Precoding: Overview, State-of-the-Art abd Future Directions (Year: 2020).*
Low Complexity User Grouping Vector Perturbation (Year: 2012).*
Predistortion Techniques for Vector Perturbation Precoding of One-Bit Massive-MIMO (Year: 2017).*
ViPer MIMO: Increasing Large MIMO Effciency via Practical Vector-Perturbation (Year: 2018).*
EP_2725731_A1 (Year: 2014).*
WO_2016076785_A1 (Year: 2016).*
WO_2014104206_A1 (Year: 2014).*
Lo, "Maximum ratio transmission", IEEE Transactions on Communications, vol. 47, Issue: 10, pp. 1458-1461, Oct. 1999.
Tomlinson, "New automatic equaliser employing modulo arithmetic", Electronics Letters, vol. 7, Issue 5-6, pp. 138-139, Mar. 1971.
Chae, et al., "Block Diagonalized Vector Perturbation for Multiuser MIMO Systems", IEEE Transactions on Wireless Communications, vol. 7, Issue: 11, pp. 4051-4057, Nov. 2008.
Chen, et al., "Low Complexity User Grouping Vector Perturbation", IEEE Wireless Communications Letters, vol. 1, Issue: 3, pp. 189-192, Jun. 2012.
Zhang, et al., "Multi-Branch Vector Perturbation Precoding Design Using Lattice Reduction for MU-MIMO Systems", 2016 IEEE 83rd Vehicular Technology Conference (VTC Spring), 2016.
Joham, et al., "Linear transmit processing in MIMO communications systems", IEEE Transactions on Signal Processing, vol. 53, No. 8, pp. 2700-2712, 2005.
Björnson, et al., "Optimal Resource Allocation in Coordinated Multi-Cell Systems", Foundations and Trends in Communications and Information Theory, vol. 9, No. 2-3, pp. 113-381, 2013.
Peel, et al., "A vector perturbation technique for near-capacity multi-antenna multiuser communication-Part I: channel inversion and regularization", IEEE Transactions on Communication, vol. 53, No. 1, pp. 195-202, 2005.
Weingarten, et al., "The capacity region of the Gaussian multiple-input multiple-output broadcast channel", IEEE Transactions on Information Theory, vol. 52, No. 9, pp. 3936-3964, 2006.
Costa, "Writing on dirty paper", IEEE Transactions on Information Theory, vol. 29, No. 3, pp. 439-441, 1983.
Hochwald, et al., "A Vector-Perturbation Technique for Near-Capacity Multiantenna Multiuser Communication—Part II: Perturbation", IEEE Transactions on Communication, vol. 53, No. 3, pp. 537-544, 2005.

* cited by examiner

DEVICES AND METHODS FOR RECURSIVE BLOCK PRECODING

CROSS-REFERENCE TO RELATED APPLICATIONS

This application is a National Stage of International patent application PCT/EP2021/076298, filed on Sep. 24, 2021, which claims priority to foreign European patent application No. EP 20306114.8, filed on Sep. 29, 2020, the disclosures of which are incorporated by reference in their entirety.

TECHNICAL FIELD

The invention generally relates to digital communications and in particular to methods and devices for precoding data signals.

BACKGROUND

Multiple-input multiple-output (MIMO) technologies were developed to increase system capacity and offer better link reliability. MIMO systems exploit the space and time dimensions to encode and multiplex more data symbols using a multiplicity of transmit and/or receive antennas, over a plurality of time slots. As a result, the capacity, range, and reliability of MIMO-based communication systems can be enhanced.

Multi-user MIMO systems are transmission systems in which single or multiple antenna users communicate with one or more multiple antenna receivers according to space division multiple access techniques. In such systems, precoding, also known as 'transmit beamforming', enables separating user data streams and pre-cancelling interference based on channel knowledge at the transmitter such that one or more objective functions (e.g. throughput maximization, fairness maximization) is satisfied under one or more constraints (e.g. sum transmit power constraint, per antenna transmit power constraint) to simultaneously serve a plurality of users in a multi-antenna wireless communication system. Different precoding techniques exist to solve different objective functions under different constraints.

Precoding techniques can be grouped into two categories: linear and non-linear. Linear precoding is realized when the signal processing procedures only involve linear operations and refers to linear transmit filters. Exemplary linear precoding techniques include:
- maximum ratio transmission (MRT) disclosed in "T. Lo, Maximum ratio transmission, IEEE Transactions on Communications, vol. 47, no. 10, pp. 1458-1461, 1999";
- Zero-Forcing (ZF) precoding disclosed in "M. Joham, W. Utschick, and J. Nossek, Linear transmit processing in MIMO communications systems, IEEE Transactions on Signal Processing, vol. 53, no. 8, pp. 2700-2712, 2005";
- Minimum Mean Square Error (MMSE) precoding disclosed in "E. Bjornson and E. Jorswieck, Optimal Resource Allocation in Coordinated Multi-Cell Systems, Foundations and Trends in Communications and Information Theory, vol. 9, no. 2-3, pp. 113-381, 2013";
- transmit Wiener precoding disclosed in "M. Joham, W. Utschick, and J. Nossek, Linear transmit processing in MIMO communications systems, IEEE Transactions on Signal Processing, vol. 53, no. 8, pp. 2700-2712, 2005", and
- regularized-ZF precoding disclosed in "C. B. Peel, B. M. Hochwald, and A. L. Swindlehurst, A vector perturbation technique for near-capacity multi-antenna multiuser communication-Part I: channel inversion and regularization. IEEE Transactions on Communication, vol. 53, no. 1, pp. 195-202, 2005".

Using ZF precoding, the transmitted vector is pre-filtered using the pseudo-inverse of the channel matrix, which requires a high transmission power particularly when the channel matrix is ill-conditioned. Linear precoding techniques require reasonable computational complexity. However they provide suboptimal performance. For example MRT only maximizes the signal gain at intended users/receivers and is close-to-optimal only in noise-limited systems where the inter-user interference is negligible compared to the noise.

Non-linear precoding is based on the concept of dirty paper coding disclosed in "H. Weingarten, Y. Steinberg, and S. Shamai, The capacity region of the Gaussian multiple-input multiple-output broadcast channel Archived 2012 Oct. 23 at the Wayback Machine, IEEE Transactions on Information Theory, vol. 52, no. 9, pp. 3936-3964, 2006".

Dirty paper coding shows that any known interference at the transmitter can be subtracted without the penalty of radio resources if optimal precoding scheme can be applied on the transmit signal. In such coding schemes, only the transmitter needs to know the interference, while full channel state information is required at the transmitter and the receivers in order to achieve the weighted sum capacity. Exemplary non-linear precoding techniques include:
- Costa precoding disclosed in "M. Costa, Writing on dirty paper, IEEE Transactions on Information Theory, vol. 29, no. 3, pp. 439-441, 1983";
- Tomlinson-Harashima precoding (THP) disclosed in "M. Tomlinson, New automatic equalizer employing modulo arithmetic, Electronics Letters, vol. 7, no. 5, pp. 138-139, 1971", and
- Vector perturbation technique disclosed in "B. M. Hochwald, C. B. Peel, and A. L. Swindlehurst, A vector-perturbation technique for near-capacity multiantenna multi-user communication—Part II: Perturbation, IEEE Transactions on Communications, vol. 53, no. 1, pp. 537-544, 2005".

THP achieves better performance than linear precoding strategies by limiting the transmit power via a non-linear modulo operation. Vector perturbation techniques enable to further reduce the transmit power by perturbing the transmitted vector, where the optimum perturbation vector is found using the Sphere Encoder disclosed in "B. Hochwald, C. Peel, and L. Swindlehurst, "A vector-perturbation technique for near-capacity multi-antenna multiuser communication-Part II: Perturbation," IEEE Transactions on Communications, vol. 53, no. 3, pp. 537-544, March 2005".

Non-linear precoding can offer significant gains in terms of throughput, but it requires a high complexity in terms of the number of floating point operations. Thus a compromise has to be found to offer a tunable trade-off between computational complexity and performance.

Conventional vector perturbation precoding considers that all users apply the same modulation while in practice users can have different modulation and coding schemes. An approach disclosed in "C. B. Chae, S. Shim, and R. W. Heath, Block diagonalized vector perturbation for multiuser MIMO systems, IEEE Trans. Wireless Communications, vol. 7, no. 11, pp. 40514057, 2008" combines block diagonalization and vector perturbation precoding to enable different users apply various modulation schemes at the price of an increased precoding complexity. Another approach based on block diagonalized vector perturbation has been proposed in "R. Chen, C. Li, J. Li, and Y. Zhang, Low complexity user grouping vector perturbation, IEEE Wireless Communication Letter, vol. 1, no. 3, pp. 189-192, 2012". This approach relies on user grouping to improve the performance of block diagonalized vector perturbation.

Although block diagonalized vector perturbation techniques offer better performance than linear precoding techniques, they remain sub-optimal since vector perturbation is applied for each user or each group independently.

There is accordingly a need for improved precoding devices and methods for multi-user multiple antenna systems enabling users to apply similar or different modulation and coding schemes and/or have different quality of service requirements.

SUMMARY

In order to address these and other problems, there is provided a precoder for precoding a vector of information symbols, the vector of information symbols comprising information symbols to be sent to a plurality of users, the precoder being configured to receive inputs from the plurality of users, the inputs comprising one or more quality of service indicators associated with each user and modulation and coding parameters associated with each user, the precoder comprising:

- a user ordering and grouping unit configured to group the plurality of users depending on the one or more quality of service indicators and on the modulation and coding parameters, which provides two or more groups of users, the user ordering and grouping unit being configured to divide a predefined upper triangular precoding matrix into a plurality of sub-matrices and to divide the vector of information symbols into a plurality of sub-vectors, each sub-vector comprising information symbols to be sent to a group of users among the two or more groups of users, the sub-vectors being arranged according to an arbitrary order of the one or more quality of service indicators;
- a precoding unit configured to determine a perturbation vector according to the minimization of a transmit power metric, the perturbation vector comprising a plurality of perturbation sub-vectors, each perturbation sub-vector corresponding to a sub-vector of information symbols, the precoding unit being configured to determine an estimate of each perturbation sub-vector by applying a recursive search algorithm, the precoding unit being configured to determine an elementary transmit power metric in association with each perturbation sub-vector from previously determined estimates of perturbation sub-vectors and to determine an estimate of a perturbation sub-vector by minimizing the elementary transmit power metric.

According to some embodiments, the precoder may further comprise a processing unit configured to determine a diagonal matrix comprising diagonal components that depend on the modulation and coding parameters.

According to some embodiments, the processing unit may be configured to determine the transmit power metric depending on the diagonal matrix, on the sub-vectors of information symbols and on the predefined upper triangular precoding matrix.

According to some embodiments, the precoding unit may be configured to set to a null vector the perturbation sub-vector corresponding to the sub-vector of information symbols to be sent to the group of users having the lowest values of the one or more quality of service indicators.

According to some embodiments, the inputs may further comprise channel state information.

According to some embodiments, each group of users may be associated with an interval of values of the one or more quality of service indicators, each interval of values of the one or more quality of service indicators being defined by a first threshold and a second threshold of the one or more quality of service indicators, the users associated with values of the one or more quality of service indicators that belong to a same interval of quality of service indicators being included in a same group of users.

According to some embodiments, the users included in a same group of users are associated with same modulation and coding parameters.

According to some embodiments, the diagonal matrix may comprise diagonal components, each diagonal component corresponding to an information symbol to be sent to a user among the plurality of users and having a value that depend on the modulation and coding parameters associated with said user.

There is also provided a method for precoding a vector of information symbols, the vector of information symbols comprising information symbols to be sent to a plurality of users, the method comprises the steps of:

- receiving inputs from the plurality of users, the inputs comprising one or more quality of service indicators associated with each user and modulation and coding parameters associated with each user;
- grouping the plurality of users depending on the one or more quality of service indicators and on the modulation and coding parameters, which provides two or more groups of users;
- dividing a predefined upper triangular precoding matrix into a plurality of sub-matrices;
- dividing the vector of information symbols into a plurality of sub-vectors, each sub-vector comprising information symbols to be sent to a group of users among the two or more groups of users, the sub-vectors being arranged according to an arbitrary order of the one or more quality of service indicators;
- determining a perturbation vector according to the minimization of a transmit power metric, the perturbation vector comprising a plurality of perturbation sub-vectors, each perturbation sub-vector corresponding to a sub-vector of information symbols, the perturbation vector being determined by determining an estimate of each perturbation sub-vector by applying a recursive search algorithm, an elementary transmit power metric being determined in association with each perturbation sub-vector from previously determined estimates of perturbation sub-vectors and an estimate of the perturbation sub-vector being determined by minimizing the elementary transmit power metric.

Advantageously, the embodiments of the invention provide precoding devices and methods taking into account the modulation and coding schemes and the quality of service parameters of the different users in a multi-user transmission system.

Advantageously, the embodiments of the invention provide precoding devices and methods enabling a support of different levels of quality of service at the same time and a delivery of a promised quality of service to all users in the high and low quality of service regime while minimizing as little the network overhead and complexity as possible.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention.

DETAILED DESCRIPTION

Embodiments of the invention provide devices and methods for precoding a vector of information symbols sent from a multi-antenna transmitter to a plurality of users through a transmission channel in a wireless communication system with a reduced computational complexity. In particular, embodiments of the present invention provide devices and methods for recursive block precoding taking into account the modulation and coding schemes applied by each of the plurality of users and the level of quality of service required by each user.

The precoding devices and methods according to the embodiments of the invention take as inputs the modulation and coding schemes and the quality of service specifications of the different users in a wireless multi-user transmission system and support the different requirements of the different users in terms of quality of service while minimizing the network overhead and complexity. Users are accordingly divided into two or more groups according to their required quality of service levels and precoding is performed jointly for the different groups of users.

The embodiments of the invention may be implemented in wireless multi-antenna transmission systems to precode a vector of information symbols to be sent to a plurality of users. The precoded vector of information symbols is sent from a multi-antenna transmitter to the plurality of users (also referred to 'receivers'), each receiver being equipped with one or more antennas. Such multi-antenna transmission systems are known as multiuser MIMO systems or distributed MIMO systems.

Figure 1:
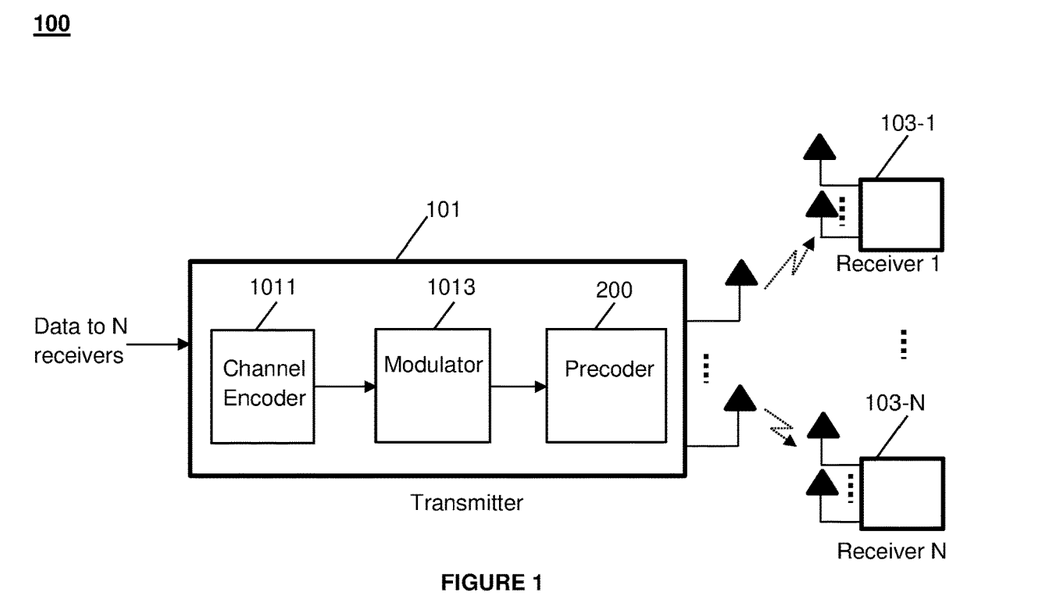
FIG. 1 is a schematic diagram of an exemplary application of the invention in a multi-antenna communication system.

FIG. 1 is a block diagram of an exemplary application of the invention to a wireless transmission system 100, according to some embodiments of the invention. The transmission system 100 may comprise a transmitter device 101 (hereinafter referred to as a "transmitter") configured to transmit data to a plurality of K 2 receiver devices 103-1 to 103-K (hereinafter referred to as "receivers" or 'users') through a transmission channel. The transmitter 101 may implement a precoder 200 to precode a vector of information symbols sent to the one or more receivers 103-1 to 103-K. Data transmission in the transmission system 100 may correspond to a downlink transmission during which the transmitter 101 is configured to serve a plurality of users 103-1 to 103-K simultaneously.

According to some embodiments, the wireless transmission system 100 may be a local area network communication system (e.g. wireless ad-hoc network), a wireless sensor network, a radio communication system (e.g. LTE, LTE-advanced, 5G and beyond). Exemplary applications comprise cellular communications, Machine-To-Machine (M2M) communications, Web-of-Things (WoT), and Internet of Things (IoT) (for example vehicle-to-everything communications).

The transmitter 101 may be any device configured to operate in a wireless environment to serve a plurality of users. For example, transmitter 101 may be a base station, a relay station, an eNode B/gNode B in a cellular network, an access point in a local area network or ad-hoc networks or any other interfacing device operating in a wireless environment. The transmitter 101 may be fixed or mobile.

The receivers 103-1 to 103-K may be any fixed or mobile device configured to operate in a wireless network and to decode the symbols sent by the transmitter 101. Exemplary receiver devices comprise without limitations mobile phones, computers, laptops, tablets, drones, and IoT devices. An IoT device may be any physical device, machine, vehicle, home alliance or any other object provided with connectivity to the Internet and the ability to collect and exchange data without requiring human-to-human or human-to-computer interactions. Exemplary technologies used to provide such connectivity may comprise 5G, LTE-NB1 (Long Term Evolution-Machine to Machine, Narrow Band) and NB-IoT (NarrowBand IoT).

According to some embodiments, the wireless transmission system 100 may be any IoT network or any M2M network used in consumer, commercial, industrial, and infrastructure applications. Exemplary consumer applications comprise connected vehicles (Internet of Vehicles IoV), home automation/smart home, smart cities, wearable technology, and connected health. Exemplary commercial applications comprise medical and healthcare and transportation. In medicine, a digitized healthcare system connecting medical resources and healthcare services may be used in which special monitors and sensors are used to enable remote health monitoring and emergency notification. In transportation systems, IoT using for example wireless sensors, can provide interaction between the vehicles and the infrastructure as well as inter and intra vehicular communications, smart traffic control, smart parking, and safety and road assistance. Exemplary industrial applications comprise applications in agriculture for example in farming using sensors to collect data on temperature, rainfall, humidity, wind speed, and soil content. Exemplary infrastructure applications comprise the use of IoT devices to perform monitoring and controlling operations of urban and rural infrastructures such as bridges and railway tracks.

In such applications, the receivers 103-1 to 103-K may be any physical internet-enabled device/object provided with required hardware and/or software technologies enabling communication over Internet. A receiver 103-1 to 103-K may be any IoT/M2M device or connected device operating in an IoT/M2M network such as medical devices, temperature and weather monitors, connected cards, smart meters, game consoles, personal digital assistants, health and fitness monitors, lights, thermostats, appliances, garage doors, security devices, drones, smart clothes, eHealth devices, robots, and smart outlets. An IoT/M2M device may be any physical device, vehicle, home appliance, or any object/thing embedded with electronics, software, sensors, actuators, and connectivity enabling remote connection for data collection and exchange with an IoT/M2M platform for example. A sensor may be any sensory organ/object/device (e.g. a transducer) that can measure a characteristic such as temperature, humidity/moisture, acoustic/sound/vibration, chemical/Gas, force/load/strain/pressure, electric/magnetic, machine vision/optical/ambient light, or position/presence/proximity.

The receivers 103-1 to 103-K may be fixed or mobile and/or may be remotely monitored and/or controlled.

The transmitter 101 may be equipped with two or more transmit antennas M 2 and each of the receivers 103-1 to 103-K may be equipped with one or more receive antennas.

According to some embodiments, the wireless transmission system 100 may use, alone or in combination, any multiple access technique such as Time Division Multiple Access (TDMA), Frequency Division Multiple Access (FDMA), Code Division Multiple Access (CDMA), and Space-Division Multiple Access (SDMA).

The transmission channel may be any linear Additive White Gaussian Noise (AWGN) channel or a multipath channel using single-carrier or multi-carrier modulation formats such as OFDM (Orthogonal Frequency Division Multiplexing) and FBMC (Filter Bank Multi-Carrier) for mitigating frequency-selectivity, interference and delays.

Accordingly, the transmitter 101 may receive a data vector that comprises data to be sent to each of the plurality of receivers 103-1 to 103-K over a noisy wireless multiuser channel represented by a channel matrix.

The embodiments of the invention provide efficient devices and methods for precoding data in multiuser MIMO systems. Accordingly, the transmitter 101 may comprise:
- a channel encoder 1011 implementing one or more Forward Error Correction (FEC) codes such as linear block codes, convolutional codes, polar codes, Low-Density Parity-Check (LDPC) codes etc;
- a modulator 1013 implementing a modulation scheme such as Quadrature Amplitude Modulation (QAM) to deliver a modulated vector of information symbol, and
- a precoder 1015 configured to determine a precoded vector of information symbols denoted $s_p$ to be sent over the transmission channel to the plurality of users 103-1 to 103-K.

The transmitter 101 may be configured to encode the received data that is a flow of information bits using the channel encoder 1011 implementing for example a linear block code, a convolutional code, a LDPC code, or a polar code. The encoded binary signal may be then modulated into a symbol vector s using the modulator 1013. Different modulation schemes may be implemented such as $2^q$-QAM or $2^q$-PSK with $2^q$ symbols or states. When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet A=[-(q-1), (q-1)]. The minimum distance d min of a modulation scheme represents the Euclidean distance between two adjacent points in the constellation and is equal to 2 in such example.

According to some embodiments illustrated in FIG. 1, the transmitter 101 may use V-BLAST spatial multiplexing to multiplex the precoded information symbols over the different transmit antennas, without performing a coding in the time dimension.

The precoded vector of information symbols may be converted from the time domain to the frequency domain using a multicarrier modulation technique, using for example OFDM or FBMC modulators, and spread over the transmit antennas. Signals may be sent from the transmit antennas after optional filtering, frequency transposition and amplification.

The embodiments of the invention provide devices and methods for precoding a vector of information symbols to be sent to the plurality of users 103-1 to 103-K taking into account the quality of service requirements of all the users as well as the modulation and coding schemes applied at each user and the channel state information.

Accordingly, each user 103-k with k=1, . . . , K may be associated with one or more quality of service indicators and modulation and coding parameters representing a modulation and coding scheme denoted by $\mathcal{M}_k$.

According to some embodiments, a quality of service indicator may be chosen in a group comprising a quality of service class identifier (QCI), a packet delay budget, and a packet error loss rate.

In exemplary applications to LTE and 5G transmission systems, the QCI may vary between the value one (T) and the value eight ('8'). The value one may correspond to a packet delay budget of 80 ms and a packet error loss rate of $10^{-2}$, for example for conversational voice services. The value two may correspond to a packet delay budget of 130 ms and a packet error loss rate of $10^{-3}$, for example for conversational video services (live streaming). The value three may correspond to a packet delay budget of 30 ms and a packet error loss rate of $10^{-2}$, for example for real time gaming services. The value four may correspond to a packet delay budget of 280 ms and a packet error loss rate of $10^{-6}$, for example for non-conversational services (buffered streaming). The value five may correspond to a packet delay budget of 80 ms and a packet error loss rate of $10^{-6}$, for example for IMS signaling. The value six may correspond to a packet delay budget of 280 ms and a packet error loss rate of $10^{-6}$, for example for video services (buffered streaming) and TCP-based services (e.g. www, e-mail, chat, ftp, peer-2-peer, file sharing, progressive video). The value seven may correspond to a packet delay budget of 80 ms and a packet error loss rate of $10^{-3}$, for example for voice services, video (live streaming), and interactive gaming services. The value eight may correspond to a packet delay budget of 280 ms and a packet error loss rate of $10^{-6}$, for example for real time gaming services, for example for video services (buffered streaming) and TCP-based services (e.g. www, e-mail, chat, ftp, peer-2-peer, file sharing, progressive video).

The modulation and coding schemes $\mathcal{M}_k$ associated with the plurality of users may be similar or may comprise two or more different modulation and coding schemes.

The transmission system 100 is a broadcast MIMO transmission system in which the transmitter 101 is equipped with M transmit antennas. The transmitter 101 is configured to serve the K users 103-1 to 103-K, each user 103-k with k=1, . . . , K being equipped with one or more ($n_k \geq 1$) receive antennas. The total number of receive antennas considering all the users 103-1 to 103-K is defined as $N_r = \Sigma_{k=1}^{K} n_k$. The transmitter 101 may be configured to receive perfect channel state information from the different users in the communication system 100 through training signals. The transmission system may be accordingly modeled by the system given by:

$$y = Hx + w \qquad (1)$$

In equation (1):
- $x \in \mathbb{C}^{M \times 1}$ designates a complex-value vector representing the signal sent by the transmitter 101 to the plurality of receivers 103-k with k=1, . . . , K;

$H \in \mathbb{C}^{N_r \times M}$ designates a complex-value matrix representing the channel matrix related to the transmission channel between the transmitter 101 and the plurality of receivers 103-$k$ with $k=1, \ldots, K$, the components of the channel matrix H are assumed to be independent and identically distributed complex Gaussian random variables with zero-mean and unitary variance;

$y \in \mathbb{C}^{N_r \times 1}$ designates a complex-value vector representing the signal received at the plurality of receive antennas of all the receivers 103-$k$ with $k=1, \ldots, K$;

$w \in \mathbb{C}^{N_r \times 1}$ designates a complex-value vector representing a zero-mean complex Gaussian noise with a variance denoted $\sigma_w^2$.

The signal x sent by the transmitter 101 depends on the information symbols s to be sent to the plurality of users. More specifically, using vector perturbation, the vector x may be expressed according to:

$$x = PF(s+Tt) \quad (2)$$

In equation (2):

P designates a transmit power;

$F \in \mathbb{C}^{M \times N_r}$ designates a complex-value matrix representing a predefined precoding matrix;

$T \in \mathbb{Z}^{N_r \times N_r}$ designates a complex-value diagonal matrix representing a scaling matrix, and $t \in \mathbb{C}^{N_r \times 1}$ designates an integer-value vector representing a perturbation vector.

According to some embodiments considering a unitary transmit power constraint, the vector x may be given by $$x = \frac{1}{\sqrt{\gamma}} F(s + Tt)$$

with $\gamma = \|F(s+Tt)\|^2$ designating the transmit power metric.

Figure 2:
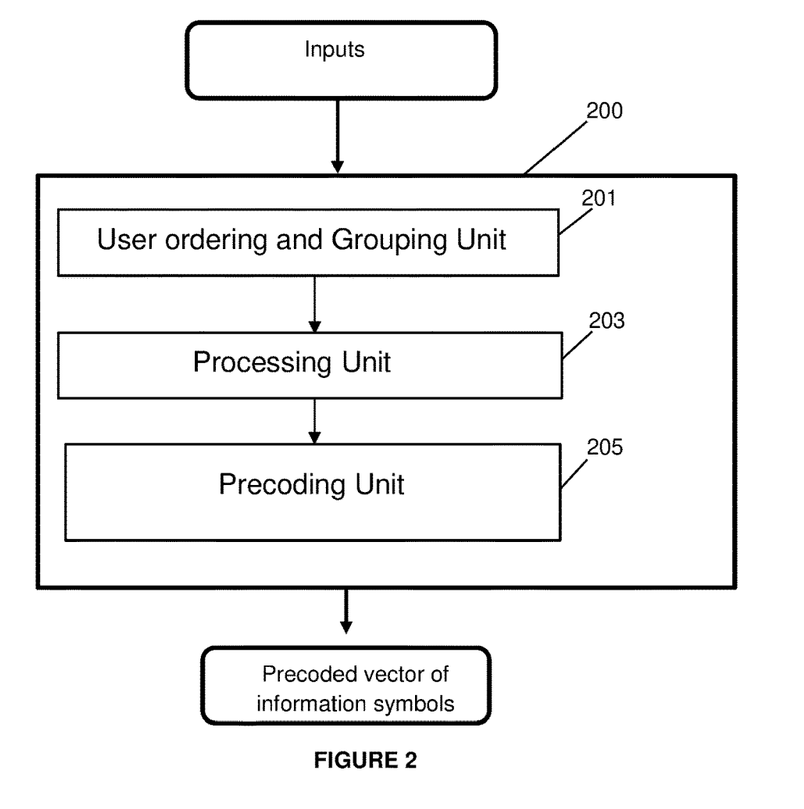
FIG. 2 is a block diagram illustrating a precoder, according to some embodiments of the invention.

The precoder 200 accordingly precodes the vector of information symbols s into a precoded vector of information symbols denoted $s_p = F(s+Tt)$ using the scaled perturbation vector Tt and the predefined precoding matrix F.

According to some embodiments using ZF precoding, the predefined precoding matrix may be given by:

$$F = H^H(H \cdot H^H)^{-1} \quad (3)$$

The embodiments of the invention provides a precoder 200 configured to precode the vector of information symbols s to be sent to the plurality of users 103-$k$ with $k=1, \ldots, K$ taking into account the quality of service specification of the different users, the channel state information, and the modulation and coding schemes associated with the different users.

Accordingly, the precoder 200 may be configured to receive input parameters comprising channel state information, the modulation and coding parameters associated with the plurality of users, and the one or more quality of service indicators associated with the plurality of users.

Referring to FIG. 2, the precoder 200 may comprise a user ordering and grouping unit 201 configured to determine two or more groups of users by grouping the plurality K of users 103-$k$ with $k=1, \ldots, K$ depending on the one or more quality of service indicators and the one or more modulation and coding parameters associated with the plurality of users. The number of groups of users is denoted by N 2.

According to some embodiments in which the modulation and coding schemes associated with the plurality of users comprise two or more different modulation and coding schemes, the plurality of users may be grouped into two or more groups such that the users associated with the same modulation and coding scheme (similarly the same modulation and coding parameters) are allocated the same group.

According to some embodiments, each group of users may be associated with an interval of values of the one or more quality of service indicators, each interval of values being defined by a first threshold and a second threshold, the users associated with values of the one or more quality of service indicators that belong to a same interval of quality of service indicators being allocated a same group of users.

According to some embodiments, the users allocated a same group of users may be associated with similar modulation and coding parameters.

The ordering and grouping of users depending on the modulation and coding parameters and the quality of service indicators associated with the different users may be used according to the embodiments of the invention to perform recursive block precoding based on vector perturbation according to the reduction of the transmit power. The optimal vector perturbation t is accordingly determined according to the minimization of the transmit power metric given by $\gamma = \|F(s+Tt)\|^2$ such that:

$$t = \underset{t' \in \mathbb{Z}^n}{\operatorname{argmin}} \|F(s+Tt')\|^2 \quad (4)$$

Recursive block precoding uses the upper triangular form of the predefined precoding matrix F that can be written in the form $F = Q \cdot R$ with Q being an orthonormal matrix and R being an upper triangular matrix referred to as a predefined upper triangular precoding matrix. Using the upper triangular structure of the predefined precoding matrix, the optimal perturbation vector t may be equivalently determined by solving the minimization problem given by:

$$\hat{t} = \underset{t' \in \mathbb{Z}^n}{\operatorname{argmin}} \|R(s+Tt')\|^2 \quad (5)$$

The optimization problem in equation (5) to find the optimal perturbation vector is accordingly represented as an integer-lattice search that solves for the integer valued perturbation vector that minimizes the transmit power metric $\gamma = \|R(s+Tt)\|^2$.

The embodiments of the invention provide recursive block precoding such that the optimal perturbation vector is determined by applying a recursive search algorithm based on a block processing that uses a block division of the predefined upper triangular precoding matrix R into a plurality of sub-matrices in accordance to a sub-vector division of the vector of information symbols to be sent to the plurality of users. The block division according to the embodiments of the invention relies on the grouping of users performed depending on the modulation and coding schemes and the quality of service indicators. Accordingly, the user ordering and grouping unit 201 may be configured to divide the predefined upper triangular precoding matrix R into a plurality of upper triangular sub-matrices and divide the vector of information symbols s into a plurality of sub-vectors, each sub-vector comprising information symbols to be sent to a group of users among the two or more groups of users, the sub-vectors of information symbols being arranged according to an arbitrary order of the one or more quality of service indicators.

Accordingly, for N≥2 groups of users, the user ordering and grouping unit 201 may be configured to divide the predefined upper triangular precoding matrix R into $$N + \frac{N(N-1)}{2}$$

sub-matrices comprising N upper triangular sub-matrices designated by $R^{(n)}$, n=1, ..., N and $$\frac{N(N-1)}{2}$$

rectangular sub-matrices designated by $B^{(nm)}$, n=1, ..., N, m=n+1, ..., N such that:

$$R = \begin{bmatrix} R^{(1)} & \cdots & B^{(1N-1)} & B^{(1N)} \\ 0 & \cdots & \vdots & \vdots \\ 0 & 0 & R^{(N-1)} & B^{(N-1N)} \\ 0 & 0 & 0 & R^{(N)} \end{bmatrix} \quad (6)$$

The user ordering and grouping unit 201 may be configured to divide the vector of information symbols s into N sub-vectors, each sub-vector of information symbols having a length $l_n$ for n=1, ..., N such that $\Sigma_{n=1}^{N} l_n = M$. The $n^{th}$ sub-vector of information symbols is denoted $s^{(n)}$ and comprises the information symbols to be sent to the $n^{th}$ group of users among the N groups of users. More specifically, the user ordering and grouping unit 201 may be configured to divide and order the information symbols into sub-vectors of information symbols such that the sub-vectors $s^{(n)}$ of information symbols are arranged in the vector of information symbols s according to an arbitrary order (ascending or descending) of the one or more quality of service indicators associated with the users of the groups of each user. In particular, the $N^{th}$ sub-vector $s^{(N)}$ of information symbols may comprise the information symbols to be sent to the group of users that are associated with the lowest values of the one or more quality of service indicators.

A divided upper triangular sub-matrix $R^{(n)}$, n=1, ..., N designates a square matrix of dimension $l_n \times l_n$.

A divided sub-matrix $B^{(nm)}$, n=1, ..., N; m=n+1, ..., N designates a rectangular matrix of dimension $l_n \times l_n$.

The precoder 200 may comprise a processing unit 203 configured to determine the diagonal matrix T depending on the modulation and coding parameters associated with the plurality of users 103-k with k=1, ..., K. More specifically, the diagonal matrix T comprises diagonal components denoted by $T_{ii}$ with i=1, ..., $N_r$, the $i^{th}$ diagonal component depends on the modulation scheme used by the user equipped with the $i^{th}$ receive antenna among the total N r antennas considering all the users. The $i^{th}$ diagonal component $T_{ii}$ is set as:

$$T_{ii} = 2\left(c_{max} + \frac{d_{min}}{2}\right) \quad (7)$$

In equation (7), $c_{max}$ designates the absolute value of the constellation point with the largest magnitude in the signal constellation associated with the modulation scheme used by the user that is equipped with the $i^{th}$ receive antenna.

According to some embodiments, the processing unit 203 may be configured to determine the transmit power metric $\gamma = \|R(s+Tt)\|^2$ depending on the diagonal matrix T, the vector of information symbols s (similarly on the sub-vectors of information symbols), and on the predefined upper triangular precoding matrix R.

The precoder 200 may further comprise a precoding unit 205 configured to determine the perturbation vector t solution of the minimization problem given in equation (5), i.e. according to the minimization of the transmit power metric given by $\gamma = \|R(s+Tt)\|^2$. Using recursive block precoding according to the embodiments of the invention, the perturbation vector t comprises N sub-vectors referred to as perturbation sub-vectors and denoted by $t^{(n)}$ with n=1, ..., N. Each perturbation sub-vector corresponds to a sub-vector of information symbols. More specifically, the $n^{th}$ perturbation sub-vector $t^{(n)}$ corresponds to the $n^{th}$ sub-vector of information symbols $s^{(n)}$ for n=1, ..., N. Block precoding according to the invention relies on determining the optimal perturbation vector t solution of the minimization problem given in equation (5) by determining an estimate $\hat{t}^{(n)}$ of each perturbation sub-vector by applying a recursive search algorithm. The optimal perturbation vector t solution of the minimization problem given in equation (5) minimizing the transmit power metric can be then expressed as $$\hat{t} = \begin{pmatrix} \hat{t}^{(1)} \\ \vdots \\ \hat{t}^{(N)} \end{pmatrix}. \quad (1)$$

Using the recursive search algorithm, the precoding unit 205 may be configured to start the process of determining the estimates of the perturbation sub-vectors $\hat{t}^{(n)}$ for n=1, ..., N by determining an estimate $\hat{t}^{(N)}$ of the $N^{(th)}$ perturbation sub-vector then, by exploiting the upper triangular structure of the precoding matrix R, determine an estimate of each perturbation sub-vector $\hat{t}^{(n)}$ from n=N−1 to n=1.

In particular, the precoding unit 205 may be configured to set to the null vector the estimate of the $N^{(th)}$ perturbation sub-vector such that $$\hat{t}^{(N)} = \begin{pmatrix} 0 \\ \vdots \\ 0 \end{pmatrix},$$

that is the estimate of the $N^{(th)}$ perturbation sub-vector $\hat{t}^{(N)}$ comprises $l_N$ zero values. Such initialization of the recursive search algorithm is equivalent to perform linear ZF precoding for the $N^{th}$ sub-vector of information symbols $s^{(N)}$.

Given the estimate of the $N^{(th)}$ perturbation sub-vector, the precoding unit 205 may be configured to recursively determine the N−1 estimates of the N−1 perturbation sub-vectors $\hat{t}^{(N-1)}, \hat{t}^{(N-2)}, \ldots, \hat{t}^{(1)}$ by determining an elementary transmit power metric in association with each perturbation sub-vector from the previously determined estimates of perturbation sub-vectors and determining the estimate of each perturbation vector $\hat{t}^{(n)}$ for n=N−1, ..., 1 by minimizing the elementary power metric associated with each perturbation vector.

Given the determined estimates of the perturbation sub-vectors, the precoding unit 205 may be configured to determine the perturbation vector as $$\hat{t} = \begin{pmatrix} \hat{t}^{(1)} \\ \vdots \\ \hat{t}^{(N)} \end{pmatrix},$$

to determine the precoded vector of information symbols $s_p = F(s+T\hat{t})$ as the product of the predefined precoding matrix F and the perturbed vector $s+T\hat{t}$ determined by adding the vector of information symbols s and the result of the product between the diagonal matrix T and the perturbation vector $\hat{t}$. The transmitted signal may be then determined as $x=PF(s+T\hat{t})$.

To illustrate the embodiments of the invention, an exemplary implementation is described in the following for a grouping of a plurality $K \geq 2$ of single-antenna users, that is $N_r=K$. The users are symmetric in the sense that they have all the same multiplexing gain equal to one ('1'). A user is said to have a diversity order d if its average bit error probability decays as $SNR^{-d}$, with SNR designating the Signal-to-Noise ratio expressed as $$SNR = \frac{P}{\sigma_w^2}.$$

All users have the same received SNR, they all experience the same diversity order, which can be taken as the diversity order of the system.

The user ordering and grouping unit 201 may be configured to determine two groups of users by grouping the K users depending on the one or more quality of service indicators and the modulation and coding parameters associated with the plurality of users. For example, the user ordering and grouping unit 201 may be configured to determine a first group of users and a second group of users, the users that belong to the first group of users having values of the one or more quality of service indicators that belong to a first interval of values of the one or more quality of service indicators, the users that belong to the second group of users having values of the one or more quality of service indicators that belong to a second interval of values of the one or more quality of service indicators. The first interval of values of the one or more quality of service indicators may represent the highest values of the one or more quality of service indicators and the second interval of values of the one or more quality of service indicators may represent the lowest values of the one or more quality of service indicators.

Considering a grouping of users into two groups, the user ordering and grouping unit 201 may be configured to divide the predefined upper triangular precoding matrix R into 4 sub-matrices comprising 2 upper triangular sub-matrices designated by $R^{(1)}$, $R^{(2)}$ and one rectangular sub-matrix designated by $B^{(12)}$ such that:

$$R = \begin{bmatrix} R^{(1)} & B^{(12)} \\ 0 & R^{(1)} \end{bmatrix} \quad (8)$$

The user ordering and grouping unit 201 may be configured to divide the vector of information symbols s into 2 sub-vectors such that $$s = \begin{pmatrix} s^{(1)} \\ s^{(2)} \end{pmatrix},$$

each sub-vector of information symbols having a length $l_n$ for n=1, 2 such that $l_1+l_2=N_r=K$. Each sub-vector of information symbols comprises information symbols to be sent to a group of users among the first group and second group of users determined by the user ordering and grouping unit 201. Further, the sub-vectors $s^{(1)}$ and $s^{(2)}$ of information symbols are arranged in the vector of information symbols s according to an arbitrary order (ascending or descending) of the one or more quality of service indicators associated with the users of the groups of each user. In particular, the sub-vector $s^{(1)}$ of information symbols may comprise the information symbols to be sent to the group of users that are associated with the highest values of the one or more quality of service indicators and the sub-vector of information symbols may comprise the information symbols to be sent to the group of users that are associated with the lowest values of the one or more quality of service indicators.

Given the ordering and the grouping of the users, the processing unit 203 may be configured to determine a diagonal matrix T with diagonal components determined according to equation (7) depending on the modulation and coding parameters associated with the plurality of users. The processing unit 203 may be further configured to determine the transmit power metric $\gamma = \|R(s+Tt)\|^2$.

Using two-block recursive precoding, the precoding unit 205 may be configured to determine the perturbation vector t solution of the minimization problem given in equation (5) such that the perturbation vector $$t = \begin{pmatrix} t^{(1)} \\ t^{(2)} \end{pmatrix}$$

comprises two perturbation sub-vectors denoted $t^{(1)}$ and $t^{(2)}$, the perturbation sub-vector $t^{(1)}$ corresponding to the sub-vector of information symbols $t^{(1)}$ and the perturbation sub-vector $t^{(2)}$ corresponding to the sub-vector of information symbols $t^{(2)}$.

Using the recursive search algorithm according to the embodiments of the invention, the precoding unit 205 may be configured to start the process of determining the estimates of the perturbation sub-vectors $\hat{t}^{(n)}$ for n=1, 2 by determining an estimate $t^{(2)}$ of the perturbation sub-vector $t^{(2)}$ then, by exploiting the upper triangular structure of the precoding matrix R, determine an estimate of the perturbation sub-vector $\hat{t}^{(1)}$.

In particular, the precoding unit 205 may be configured to set to the null vector the estimate of the perturbation sub-vector $t^{(2)}$ such that $$\hat{t}^{(2)} = \begin{pmatrix} 0 \\ \vdots \\ 0 \end{pmatrix}.$$

Then, given $\hat{t}^{(2)}$, the precoding unit 205 may be configured to determine the estimate of the perturbation sub-vectors $\hat{t}^{(1)}$ by determining an elementary transmit power metric denoted $\gamma_1$ in association with the perturbation sub-vector $t^{(1)}$ from the previously determined estimate $\hat{t}^{(2)}$ of the perturbation sub-vector $t^{(2)}$ and determining the estimate of the perturbation vector $\hat{t}^{(1)}$ by minimizing the elementary power metric associated with each perturbation vector. More specifically, the precoding unit 205 may be configured to determine the elementary transmit power metric $\gamma_1$ as:

$$\gamma_1 = \|R^{(1)}(s^{(1)} + Tt^{(1)}) + B^{(12)}(s^{(2)} + Tt^{(2)})\|^2 \quad (9)$$

The precoding unit 205 may be configured to determine the estimate $\hat{t}^{(1)}$ according to the minimization of the elementary transmit power metric $\gamma_1$ such that:

$$\hat{t}^{(1)} = \arg\min_{t^{(1)} \in \mathbb{Z}^{l_1}} \gamma_1 \quad (10)$$

The inventors showed through analytical calculation that, using the recursive block precoding considering two groups of users, the diversity order for each user among the plurality of users is given by:

$$d = M - K + l_1 \quad (11)$$

As shown in equation (11), the block precoding scheme according to the embodiments of the invention enables achieving a desired diversity order by fixing the block length $l_1$ that corresponds to the number of users in the first group of users.

Figure 3:
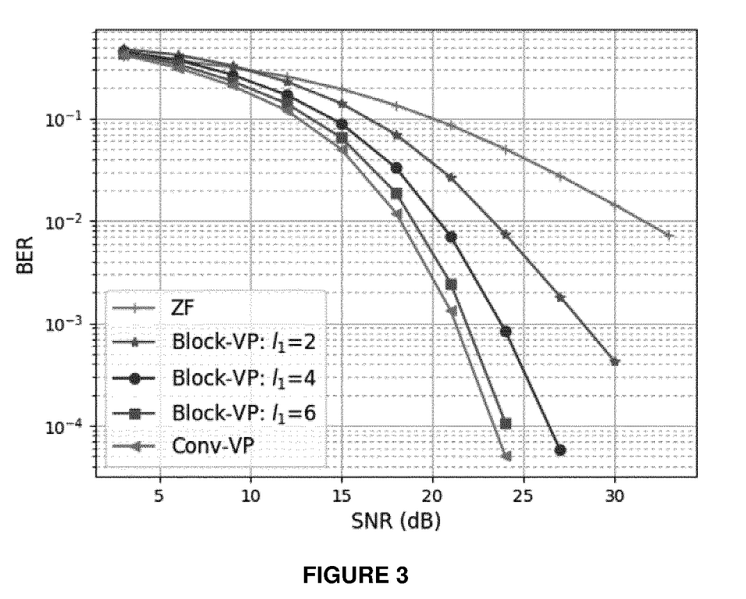
FIG. 3 illustrates diagrams evaluating the bit error rate performance obtained using recursive block precoding, according to some embodiments of the invention.
Figure 4:
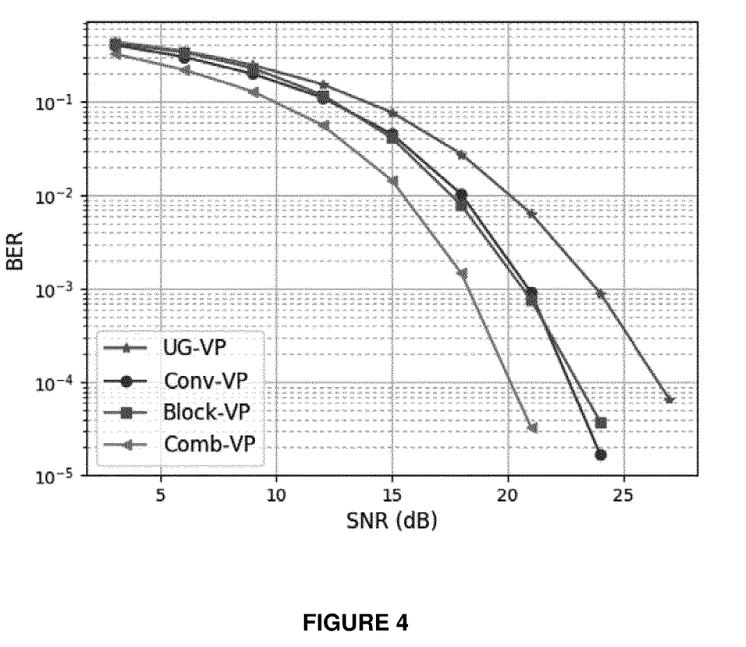
FIG. 4 illustrates diagrams evaluating the bit error rate performance obtained using recursive block precoding, according to some embodiments of the invention.

Performance of the block precoding scheme based on user grouping into two groups of users has been evaluated using numerical Monte Carlo simulations. FIGS. 3 and 4 illustrates diagrams evaluating the bit error rate performance as a function of the SNR obtained using the block precoding scheme (referred to as 'Block-VP') according to the embodiments of the invention. The performance of the block precoding scheme is compared to the performances obtained using different prior art precoding schemes comprising ZF precoding (referred to as 'ZF'), the conventional vector perturbation precoding (referred to as 'Conv-VP'), a vector perturbation scheme based on non-linear precoding for an adaptive modulation scenario (referred to as 'Comb-VP'), and a vector perturbation precoding scheme based on user grouping (referred to as 'UG-VP'). The bit error rate performance has been evaluated for a multi-user communication system in which a transmitter equipped with M=8 antennas serves K=8 single antenna users. The block precoding scheme considers a grouping of the users into two groups. Simulations have been performed for different number of users in the first group of user (similarly a variable length $l_1$ of the sub-vector of information symbols $s^{(1)}$). The BER performance diagrams shown in FIG. 3 are obtained considering a similar modulation scheme (16-QAM) for all the users. The BER performance diagrams shown in FIG. 4 are obtained considering two different modulation schemes (4-QAM and 16-QAM) and user grouping based on the modulation order such that the users using the same modulation order are allocated the same group. The first group of users comprises four users that use 4-QAM modulation and the second group of users comprises four users that use 16-QAM modulation. The numerical results depicted in FIG. 3 confirm the theoretical result indicating that the diversity order is M-K+$l_1$. The numerical results depicted in FIG. 4 show that the proposed block precoding scheme outperforms the existing UG-VP and Cony-VP precoding schemes.

Figure 5:
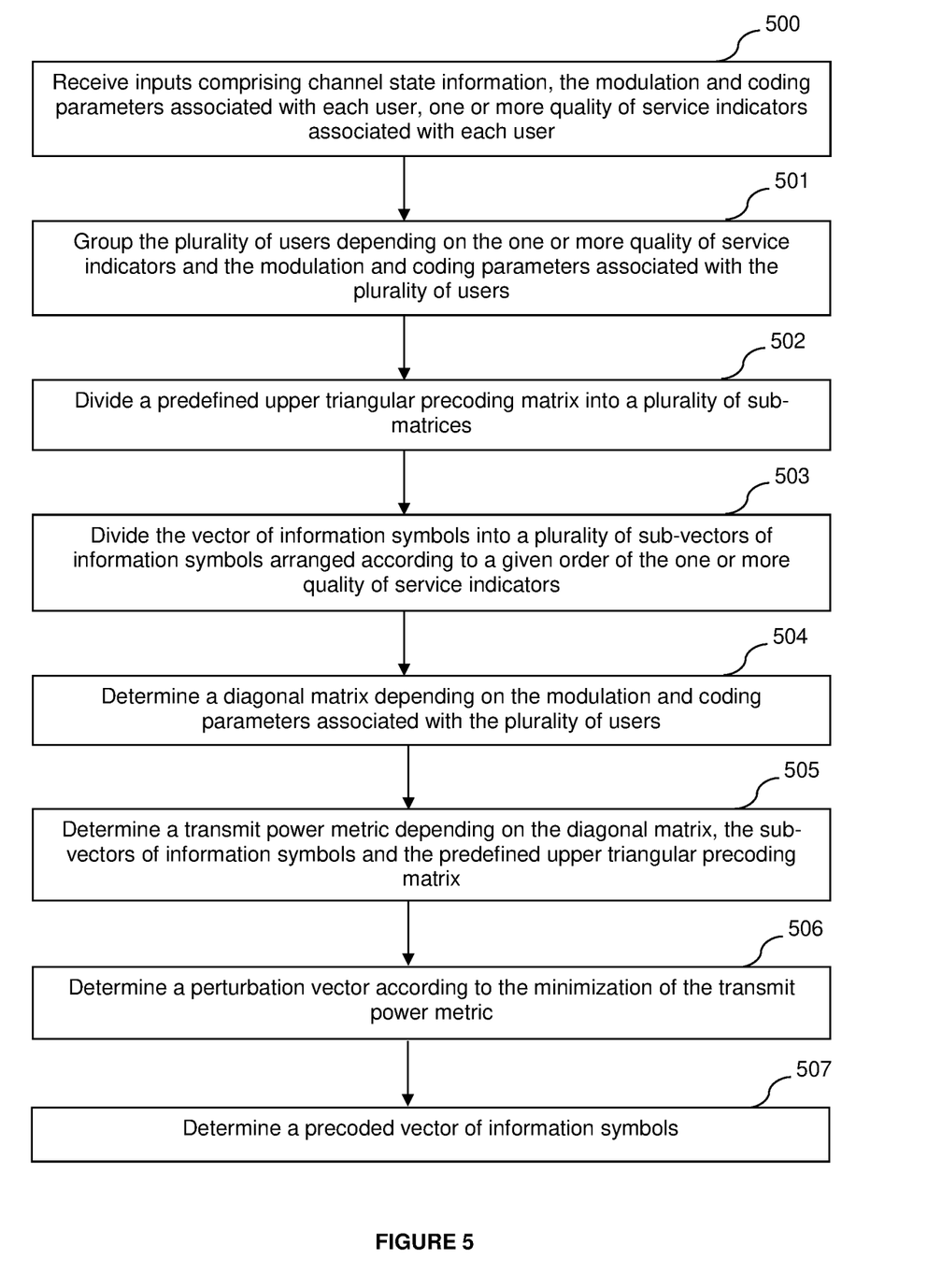
FIG. 5 is a flowchart illustrating a precoding method, according to some embodiments of the invention.

Referring to FIG. 5, there is also provided a precoding method for precoding a vector of information symbols s that comprises information symbols sent from a transmitter equipped with M transmit antennas to a plurality of users (K≥2), each user being equipped with one or more receive antennas ($n_k \geq 1$, k=1, . . . , K) such that the total number of receive antennas considering all the users is given by $N_r = \Sigma_{k=1}^{K} n_k$. The method relies on using recursive block vector perturbation to precode the vector of information symbols s into a precoded vector of information symbols $s_p$.

At step 500, inputs may be received, comprising a vector of information symbols s, a predefined upper triangular precoding matrix R, channel state information, the modulation and coding parameters associated with each user among the plurality of users, and one or more quality of service indicators associated with each user among the plurality of users.

At step 501, two or more groups of users may be determined by grouping the plurality K of users 103-k with k=1, . . . , K depending on the one or more quality of service indicators and the one or more modulation and coding parameters associated with the plurality of users. The number of groups of users is denoted by N≥2.

According to some embodiments in which the modulation and coding schemes associated with the plurality of users comprise two or more different modulation and coding schemes, the plurality of users may be grouped into two or more groups such that the users associated with the same modulation and coding scheme (similarly the same modulation and coding parameters) are allocated the same group.

According to some embodiments, each group of users may be associated with an interval of values of the one or more quality of service indicators, each interval of values being defined by a first threshold and a second threshold, the users associated with values of the one or more quality of service indicators that belong to a same interval of quality of service indicators being allocated a same group of users.

According to some embodiments, the users allocated a same group of users may be associated with similar modulation and coding parameters.

The ordering and grouping of users depending on the modulation and coding parameters and the quality of service indicators associated with the different users may be used according to the embodiments of the invention to perform recursive block precoding. The optimal vector perturbation t is accordingly determined according to the minimization of the transmit power metric given by equation (4).

Recursive block precoding uses the upper triangular form of the predefined precoding matrix F that can be written in the form F=Q. R with Q being an orthonormal matrix and R being an upper triangular matrix referred to as a predefined upper triangular precoding matrix. Using the upper triangular structure of the predefined precoding matrix, the optimal perturbation vector t may be equivalently determined by solving the minimization problem given by equation (5).

Recursive block precoding relies on determining the optimal perturbation vector by applying a recursive search algorithm based on a block processing that uses a block division of the predefined upper triangular precoding matrix R into a plurality of sub-matrices in accordance to a sub-vector division of the vector of information symbols to be sent to the plurality of users. The block division according to the embodiments of the invention relies on the grouping of users performed depending on the modulation and coding schemes and the quality of service indicators. Accordingly, at step 502, the predefined upper triangular precoding matrix R may be divided into $$N + \frac{N(N-1)}{2}$$

sup-matrices comprising N upper triangular sub-matrices designated by $R^{(n)}$, n=1, ..., N and $$\frac{N(N-1)}{2}$$

rectangular sub-matrices designated by $B^{(nm)}$, n=1, ..., N, m=n+1, ..., N as given in equation (6).

At step 503, the vector of information symbols s may be divided into N sub-vectors, each sub-vector of information symbols having a length $l_n$ for n=1, ..., N such that $\sum_{n=1}^{N} l_n = M$. The $n^{th}$ sub-vector of information symbols is denoted $s^{(n)}$ and comprises the information symbols to be sent to the $n^{th}$ group of users among the N groups of users. The sub-vectors of information symbols may be ordered according to an arbitrary order (ascending or descending) of the one or more quality of service indicators associated with the users of the groups of each user. In particular, the $N^{th}$ sub-vector $s^{(N)}$ of information symbols may comprise the information symbols to be sent to the group of users that are associated with the lowest values of the one or more quality of service indicators.

At step 504, a diagonal matrix T may be determined depending on the modulation and coding parameters associated with the plurality of users. More specifically, the diagonal matrix T comprises diagonal components $T_{ii}$ with i=1, ..., $N_r$, the $i^{th}$ diagonal component being determined depending on the modulation scheme used by the user equipped with the $i^{th}$ receive antenna among the total N r antennas considering all the users according to equation (7).

At step 505, a transmit power metric $\gamma = \|R(s+Tt)\|^2$ may be determined depending on the diagonal matrix T, the vector of information symbols s (similarly on the sub-vectors of information symbols), and on the predefined upper triangular precoding matrix R.

At step 506, the perturbation vector $\hat{t}$ solution of the minimization problem given in equation (5), i.e. according to the minimization of the transmit power metric given by $\gamma = \|R(s+Tt)\|^2$, may be determined.

Using recursive block precoding according to the embodiments of the invention, the perturbation vector t comprises N sub-vectors referred to as perturbation sub-vectors $t^{(n)}$ with n=1, ..., N. Each perturbation sub-vector corresponds to a sub-vector of information symbols. More specifically, the $n^{th}$ perturbation sub-vector $t^{(n)}$ corresponds to the $n^{th}$ sub-vector of information symbols $s^{(n)}$ for n=1, ..., N. Block precoding according to the invention relies on determining the optimal perturbation vector $\hat{t}$ solution of the minimization problem given in equation (5) by determining an estimate $\hat{t}^{(n)}$ of each perturbation sub-vector by applying a recursive search algorithm. The optimal perturbation vector $\hat{t}$ solution of the minimization problem given in equation (5) minimizing the transmit power metric can be then expressed as $$\hat{t} = \begin{pmatrix} \hat{t}^{(1)} \\ \vdots \\ \hat{t}^{(N)} \end{pmatrix}.$$

Step 506 may comprise a recursive search algorithm for determining the estimates of the perturbation sub-vectors $\hat{t}^{(n)}$ for n=1, ..., N by determining an estimate $\hat{t}^{(N)}$ of the $N^{(th)}$ perturbation sub-vector then, by exploiting the upper triangular structure of the precoding matrix R, determining an estimate of each perturbation sub-vector $\hat{t}^{(n)}$ from n=N−1 to n=1.

In particular, the recursive search algorithm may comprise setting to the null vector the estimate of the $N^{(th)}$ perturbation sub-vector such that $$\hat{t}^{(N)} = \begin{pmatrix} 0 \\ \vdots \\ 0 \end{pmatrix},$$

that is the estimate of the $N^{(th)}$ perturbation sub-vector $\hat{t}^{(N)}$ comprises $l_N$ zero values. Such initialization of the recursive search algorithm is equivalent to performing linear ZF precoding for the $N^{th}$ sub-vector of information symbols $s^{(N)}$.

Given the estimate of the $N^{(th)}$ perturbation sub-vector, the N−1 estimates of the N−1 perturbation sub-vectors $\hat{t}^{(N-1)}$, $\hat{t}^{(N-2)}$, ..., $\hat{t}^{(1)}$ may be determined by determining an elementary transmit power metric in association with each perturbation sub-vector from the previously determined estimates of perturbation sub-vectors and determining the estimate of each perturbation vector $\hat{t}^{(n)}$ for n=N−1, ..., 1 by minimizing the elementary power metric associated with each perturbation vector.

Given the determined estimates of the perturbation sub-vectors, step 506 may further comprise determining the perturbation vector as $$\hat{t} = \begin{pmatrix} \hat{t}^{(1)} \\ \vdots \\ \hat{t}^{(N)} \end{pmatrix}.$$

At step 507, a precoded vector of information symbols $s_p = R(s+T\hat{t})$ may be determined as the product of the predefined upper triangular precoding matrix R and the perturbed vector $s+T\hat{t}$ determined by adding the vector of information symbols s and the result of the product between the diagonal matrix T and the perturbation vector $\hat{t}$.

The method described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

The invention claimed is:

1. A precoder for precoding a vector of information symbols, said vector of information symbols comprising information symbols to be sent to a plurality of users, wherein the precoder is configured to receive inputs from said plurality of users, said inputs comprising one or more quality of service indicators associated with each user and modulation and coding parameters associated with each user, the precoder comprising:

a user ordering and grouping unit configured to group said plurality of users depending on said one or more quality of service indicators and on said modulation and coding parameters, which provides two or more groups of users, the user ordering and grouping unit being configured to divide a predefined upper triangular precoding matrix into a plurality of sub-matrices and to divide said vector of information symbols into a plurality of sub-vectors, each sub-vector comprising information symbols to be sent to a group of users among said two or more groups of users, said sub-vectors being arranged according to an arbitrary order of the one or more quality of service indicators;

a precoding unit configured to determine a perturbation vector according to the minimization of a transmit power metric, said perturbation vector comprising a plurality of perturbation sub-vectors, each perturbation sub-vector corresponding to a sub-vector of information symbols, the precoding unit being configured to determine an estimate of each perturbation sub-vector by applying a recursive search algorithm, the precoding unit being configured to determine an elementary transmit power metric in association with each perturbation sub-vector from previously determined estimates of perturbation sub-vectors and to determine an estimate of a perturbation sub-vector by minimizing said elementary transmit power metric.

2. The precoder of claim 1, wherein the precoder further comprises a processing unit configured to determine a diagonal matrix comprising diagonal components that depend on said modulation and coding parameters.

3. The precoder of claim 2, wherein the processing unit is configured to determine said transmit power metric depending on said diagonal matrix, on said sub-vectors of information symbols and on said predefined upper triangular precoding matrix.

4. The precoder of claim 1, wherein the precoding unit is configured to set to a null vector the perturbation sub-vector corresponding to the sub-vector of information symbols to be sent to the group of users having the lowest values of the one or more quality of service indicators.

5. The precoder of claim 1, wherein said inputs further comprise channel state information.

6. The precoder of claim 1, wherein each group of users is associated with an interval of values of the one or more quality of service indicators, each interval of values of the one or more quality of service indicators being defined by a first threshold and a second threshold of the one or more quality of service indicators, the users associated with values of the one or more quality of service indicators that belong to a same interval of quality of service indicators being included in a same group of users.

7. The precoder of claim 1, wherein users included in a same group of users are associated with same modulation and coding parameters.

8. The precoder of claim 1, wherein said diagonal matrix comprises diagonal components, each diagonal component corresponding to an information symbol to be sent to a user among said plurality of users and having a value that depend on the modulation and coding parameters associated with said user.

9. A method for precoding a vector of information symbols, said vector of information symbols comprising information symbols to be sent to a plurality of users, wherein the method comprises the steps of:

receiving inputs from said plurality of users, said inputs comprising one or more quality of service indicators associated with each user and modulation and coding parameters associated with each user;

grouping said plurality of users depending on said one or more quality of service indicators and on said modulation and coding parameters, which provides two or more groups of users;

dividing a predefined upper triangular precoding matrix into a plurality of sub-matrices;

dividing said vector of information symbols into a plurality of sub-vectors, each sub-vector comprising information symbols to be sent to a group of users among said two or more groups of users, said sub-vectors being arranged according to an arbitrary order of the one or more quality of service indicators;

determining a perturbation vector according to the minimization of a transmit power metric, said perturbation vector comprising a plurality of perturbation sub-vectors, each perturbation sub-vector corresponding to a sub-vector of information symbols, said perturbation vector being determined by determining an estimate of each perturbation sub-vector by applying a recursive search algorithm, an elementary transmit power metric being determined in association with each perturbation sub-vector from previously determined estimates of perturbation sub-vectors and an estimate of said perturbation sub-vector being determined by minimizing said elementary transmit power metric.

* * * * *